(12) United States Patent
Knoll et al.

(10) Patent No.: US 6,294,990 B1
(45) Date of Patent: Sep. 25, 2001

(54) DISPLAY DEVICE

(75) Inventors: Peter Knoll, Ettlingen; Stefan Graf, Markgroeningen; Thomas Haeberer, Stuttgart; Derk Oreans, Leonberg; Hermann Gaus, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/091,774

(22) PCT Filed: Dec. 13, 1996

(86) PCT No.: PCT/DE96/02400

§ 371 Date: Jan. 6, 1999

§ 102(e) Date: Jan. 6, 1999

(87) PCT Pub. No.: WO97/22853

PCT Pub. Date: Jun. 26, 1997

(30) Foreign Application Priority Data

Dec. 19, 1995 (DE) ............................................. 195 47 375

(51) Int. Cl.⁷ .................................................... B60Q 1/00
(52) U.S. Cl. .............................. 340/461; 340/438; 340/441
(58) Field of Search ..................................... 340/438, 441, 340/439, 461

(56) References Cited

U.S. PATENT DOCUMENTS

| 4,262,255 | | 4/1981 | Kokei et al | 324/103 |
| 4,308,527 | * | 12/1981 | Moreau et al. | 340/461 |
| 4,647,901 | | 3/1987 | Teshima et al. | 340/467 |
| 5,309,139 | * | 5/1994 | Austin | 340/462 |

FOREIGN PATENT DOCUMENTS

| 2447286 | 8/1980 | (FR) . |
| 02 002038 | 1/1989 | (JP) . |

* cited by examiner

*Primary Examiner*—Daryl Pope
(74) *Attorney, Agent, or Firm*—Kenyon & Kenyon

(57) ABSTRACT

A display device for a motor vehicle for displaying at least two related display parameters with the help of scale segments. At least one scale segment can be controlled to differentiate the two display parameters so that color, contrast and/or brightness can be differentiated in comparison with the other scale segments.

21 Claims, 2 Drawing Sheets

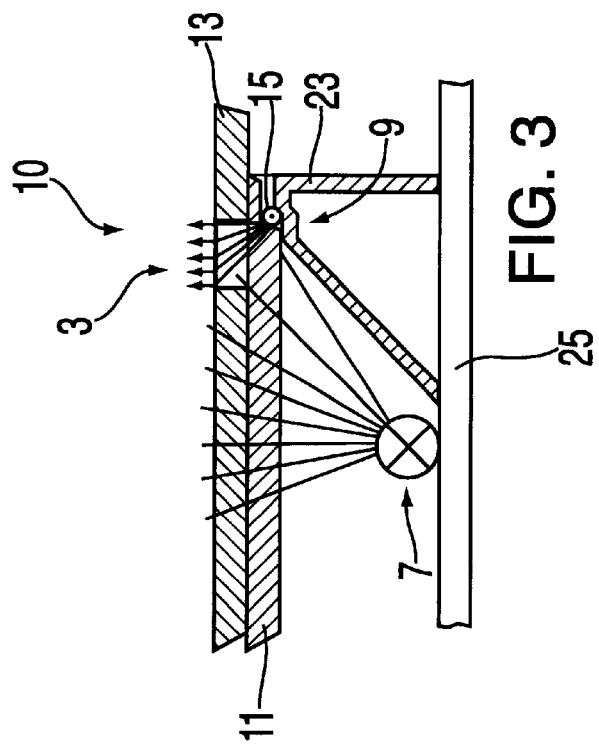
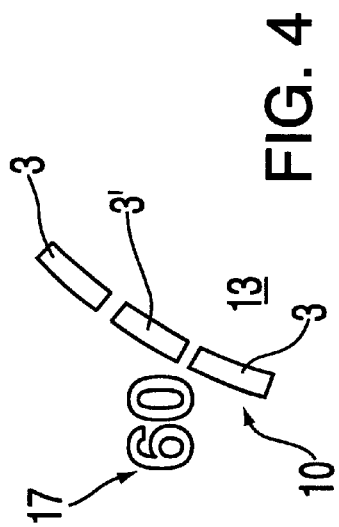
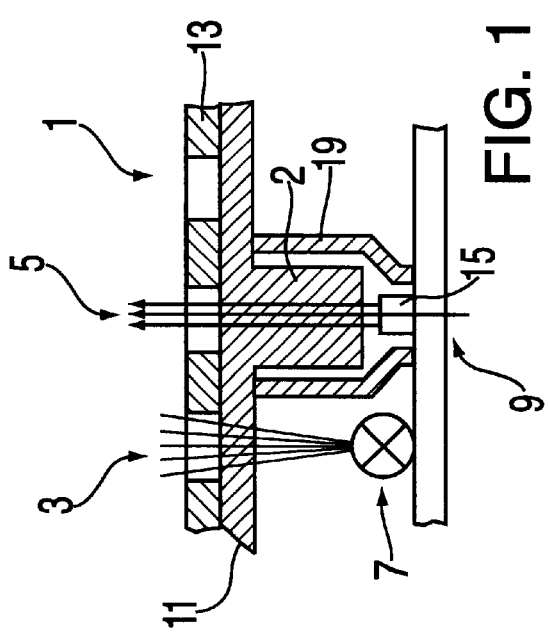
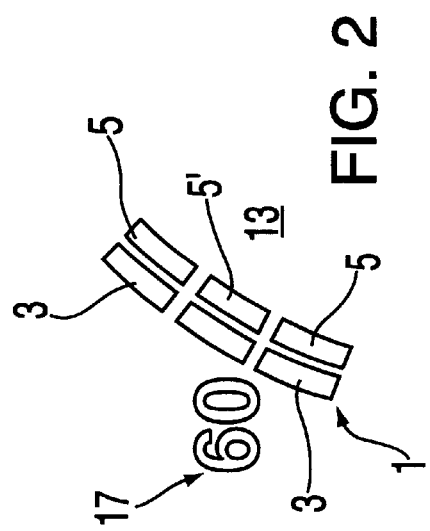

DISPLAY DEVICE

FIELD OF THE INVENTION

The present invention relates to a display device f or a motor vehicle for displaying at least two related display parameters with the help of scale segments.

BACKGROUND INFORMATION

Conventional display devices are used, for example, to control the driving speed of a motor vehicle. The programmable setpoint referred to as the set speed for the automatic cruise control is set by depressing a set button, for example. This set speed is not usually displayed. There are embodiments wherein the desired set speed is shown on a separate display which is set apart from the conventional speed display.

SUMMARY OF THE INVENTION

The display device according to the present invention has the advantage over the related art in that the driver of the vehicle can easily view two related display parameters, in this case the instantaneous driving speed and the desired set speed, so that driving safety is greatly increased.

In a preferred embodiment of the display device, two separate lighting devices are provided, one of which is assigned to several scale segments of the display device and the other of which has individual lighting segments belonging to a single scale segment. In a display device of this type, the instantaneous speed can be displayed continuously, while the second lighting device can be used to show the speed value corresponding to the set speed. The scale segments showing the set speed are clearly distinguishable by color, contrast and/or brightness from the scale segments displaying the instantaneous speed.

In addition, an exemplary embodiment of the display device has a lighting device to which several scale segments are assigned and is preferred due to the fact that at least some, preferably all scale segments, have a switching device assigned to them which influences the optical properties of the scale segments. With a display device of this type, it is possible to emphasize individual scale segments through their optical properties so that they are clearly differentiated from the other scale segments and can be discerned easily. The driver of a vehicle with such a display device can easily read the current speed and at the same time can see the programmed setpoint or set speed.

BRIEF DESCRIPTION OF THE DRAWINGS

FIG. 1 shows a schematic section through a first exemplary embodiment of a display device according to the present invention.

FIG. 2 shows a top view of a detail of the display device shown in FIG. 1.

FIG. 3 shows a schematic section through another exemplary embodiment of a display device according to the present invention.

FIG. 4 shows a top view of a part of the display device shown in FIG. 3.

DETAILED DESCRIPTION OF THE INVENTION

Figure 7:
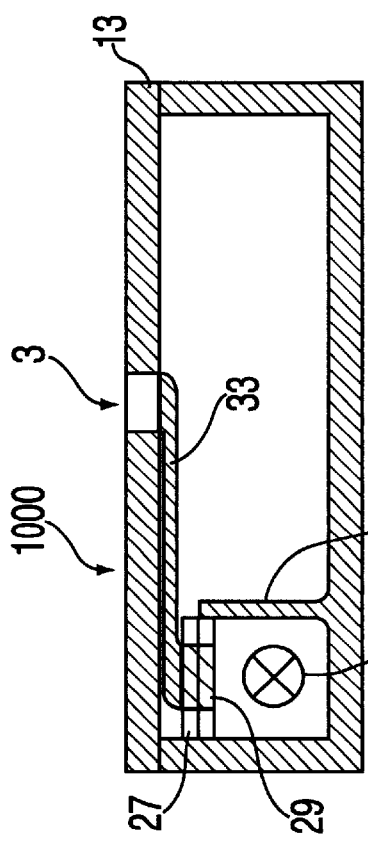
FIG. 7 shows a section through a further exemplary embodiment of a display device according to the present invention.

The display device displays two related display parameters with the help of scale segments. As an example, it is assumed below that the display device here is the display for an automatic cruise control.

The display shows the instantaneous driving speed and the setpoint or set speed which can be programmed by the driver.

The sectional diagram in FIG. 1 shows a first exemplary embodiment of a display device 1 which displays two related display parameters, e.g., the actual speed and the set speed. Scale segments 3 and 5 are provided to display the two display parameters. The first scale segment 3 serves to display the actual quantity, for example, while the second scale segment 5 serves to display the setpoint. Display device 1 has two lighting devices 7 and 9, the first of which, lighting device 7, is assigned to scale segments 3 and the second lighting device 9 is assigned to scale segments 5. The first lighting device 7 can be implemented by any light-emitting devices, such as LEDs, incandescent bulbs, cold cathode fluorescent lamps or the like. The light-emitting devices emit light, as indicated by the lines, passing through a lighting disk 11 and striking a display area 13, e.g., the face of a multiple display device in a motor vehicle. Display area 13 is provided with perforations which form scale segments 3 and 5. The first scale segments 3 are thus lighted up by the first lighting device 7.

The second lighting device 9 has individual lighting elements 15, each of which is assigned to a single scale segment 5.

It is apparent from the top view of a portion of display device 1 shown in FIG. 2 that scale segments 3 are part of a scale which is backlit by the first lighting device 7 and may also include digital displays 17. Scale segments 3 serve to display the actual speed and they are part of an analog display scale that works together with a traditional pointer display.

Scale segments 5 are part of a concomitant scale which to display the display parameter assigned to the actual speed, e.g., the set speed.

On depressing a set button, the set speed can be displayed by assigning a corresponding scale segment, e.g., scale segment 5', to displaying the set speed 60 kg/h. It is also possible to activate all scale segments 5 up to scale segment 5', which corresponds to the desired set speed. This is accomplished by activating second lighting device 9 or its individual lighting elements 15 so that the respective scale segments 5 are differentiated from scale segments 3 by a difference in lighting intensity or brightness or by a difference in color. Scale segments 3 may be backlit with white, for example, while scale segments 5 for displaying the setpoint or set speed light up in a different color. As illustrated in FIG. 1, the light rays of the individual lighting elements 15 are arranged in a lighting well 19, which is visually separated from the first lighting device 7 and may have a light guide element 21, for example, through which the light emanated by individual lighting element 15 is relayed to scale segment 5, as indicated by arrows.

Individual lighting element 15 may be implemented as a light emitting diode (LED) or by another suitable small light source.

The partial sectional view shown in FIG. 3 shows another exemplary embodiment of a display device 10, which also has two lighting devices 7 and 9. The same parts are labeled with the same reference numbers, so that reference is made to the description given for FIG. 1.

The first lighting device 7 corresponds to that explained with reference to FIG. 1. It has the function of lighting a row of scale segments 3 which serve to display a first display parameter, e.g., the actual speed. Scale segments 3 are implemented in turn by cutouts in a display area 13 with a lighting disk 11 behind it. Lighting disk 11 and the face or display area 13 of display device 10 are supported by a mounting device and lighting well device 23 which, like lighting device 7, is arranged on a base plate 25. In the contact area which approximately corresponds to the edge area of scale segment 3 the second lighting device 9 is provided which in turn has individual lighting segments 15, each of which is assigned to an individual scale segment. It can be seen that the individual lighting segments 15 do not illuminate separate scale segments 5 here. Instead, the rays of light (indicated by arrows) of the individual lighting segments 15 pass through scale segments 3 and can thus be perceived by an observer or driver.

Scale segments 3 have thus been assigned a peripheral ring of light comprising individual lighting elements which are implemented in the form of light emitting diodes, for example. Laterally incident light from the individual lighting elements 15 is superimposed on the light emitted by the first lighting device 7. The diagram shows that light from the first lighting device 7 can pass through the area of display face 13 of display device 10, i.e., it more or less serves as background lighting.

FIG. 4 shows a top view of a detail of display device 10. It is characteristic that a single scale segment group is provided here, formed by scale segments 3. Here again, digits 17 may be provided to permit a reading of both the actual speed and the set speed.

The scale formed by scale segments 3 is backlit—with white, for example—by first lighting device 7. When the operator depresses the set button, a single scale segment, e.g., scale segment 3', is additionally lighted by the respective individual lighting element 15, thereby resulting in an increased brightness, but preferably forming a different color than that of the other scale segments 3. Thus, in one glance the driver can read the setpoint or the set speed without having to observe any other speed display than that desired, as is the case with conventional devices. The instantaneous speed is displayed on scale segments 3 with the help of a pointer (not shown here).

Figure 5:
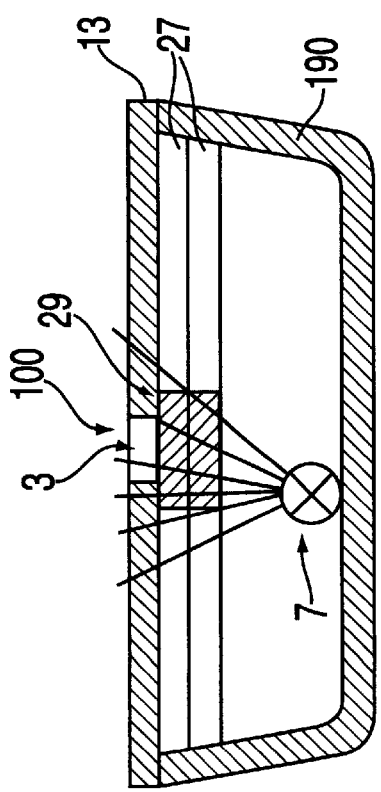
FIG. 5 shows a section through yet another exemplary embodiment of a display device according to the present invention.

FIG. 5 shows yet another exemplary embodiment of display device 100, which is characterized in that only a single lighting device 7 is provided, and light from it illuminates scale segments 3 provided in the form of cutouts in a display face 13. Lines indicate that light passes through the entire display face 13, so that background lighting is achieved by lighting device 7. Lighting device 7 is accommodated in a lighting well 190 which acts as a reflector box whose inside surface may have a reflective coating, for example. Lighting device 7 is implemented in a known way, as illustrated on the basis of FIG. 1.

Beneath display face 13 which serves as a dial face, there is a liquid crystal layer 27 which has a switching device in the form of switch panels 29 beneath a scale segment 3. Switch panels 29 serve as transmission switches. They thus influence the transparency of liquid crystal layer 27 in the area of scale segments 3. When the switch panel is turned off, the light of lighting device 7 can pass through display face 13 unhindered, but it is shaded when switch panel 29 is turned on.

Figure 6:
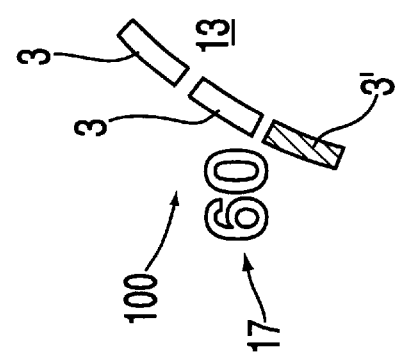
FIG. 6 shows a top view of a portion of the display device shown in FIG. 5.

FIG. 6, showing a top view of a portion of display device 100, shows that a scale field 3' appears darker than the other scale segments 3 of display device 100. The same parts in FIGS. 5 and 6 are labeled with the same reference numbers, so they need not be described further here.

FIG. 6 shows that scale segments 3 may be supplemented by digits, so that the actual speed can be displayed clearly for a driver using a conventional pointer. When operating a set button, the desired set speed is displayed by the fact that a respective scale segment 3' appears darker because the transparency of liquid crystal layer 27 is reduced here by the respective switch panel 29.

Thus, it is apparent that display device 100 is simplified in comparison with the exemplary embodiments illustrated in FIGS. 1 through 4 inasmuch as only a single lighting device 7 need be provided.

With the exemplary embodiment illustrated in FIG. 5, lighting device 7 may be adapted to a curved scale field. In lighting well 190 of display device 100, it is also possible to arrange several straight-line lighting devices inside the arc-shaped lighting well and thus to light all scale segments 3 of display device 100. Scale segments 3 may also be lighted unevenly, even if switch panels 29 are not lighted, i.e., their transparency is reduced.

Figure 8:
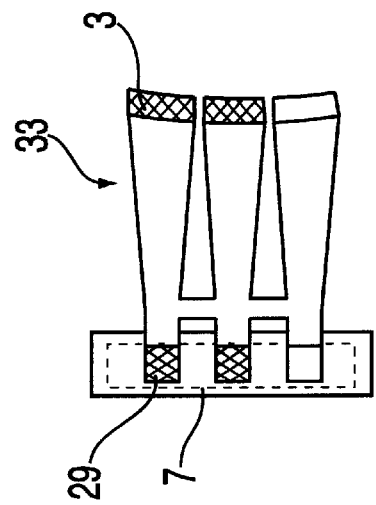
FIG. 8 shows a detailed view of the display device shown in FIG. 7.

For this reason, the display device may also be modified as illustrated on the basis of FIGS. 7 and 8. The sectional diagram in FIG. 7 shows a display device 1000 which again has only a single lighting device 7. However, it is sealed off here from the rest of the lighting well or reflector box by light-proof partition 31. The space above lighting device 7 is again covered in the direction of display face 13 by a liquid crystal layer 27 having switch panels 29 assigned to scale segments 3 in display face 13; when said switch panels are activated, they suppress or reduce the passage of light from lighting device 7 to scale segments 3.

It can be seen that the light coming from lighting device 7 cannot go directly to scale segments 3. A light guide device is provided here, guiding the light coming from lighting device 7 and going through switch panels 29 to scale segments 3.

FIG. 8 shows that lighting device 7, shown with dashed lines, may be designed as a straight-line device, and scale segments 3 may be designed to curve along a circular line. The exemplary embodiment of display device 1000 shown in FIGS. 7 and 8 is distinguished by the fact that lighting device 7 can be implemented relatively inexpensively because no curved light sources need be used here, as is required in the exemplary embodiment illustrated on the basis of FIG. 5.

FIG. 8 shows that the effective reflex area of light guide device 33 appears dark when the respective switch panels 29 are activated. It is thus possible to implement a display device 1000 having a continuous row of scale segments 3, at least one of which appears set off visually when a set button is depressed. It is possible to darken all scale segments 3 of a display device 1000 and have only a single segment appear bright due to inactivation of the respective switch panel to make a desired speed setpoint easily discerned visually. The opposite implementation may also be possible: only the desired scale segment of the set speed selected by the driver is darkened, while all the other scale segments appear bright. Finally, it is also possible to set off all scale segments up to the set speed with the help of the switch panels in comparison with the other segments, i.e., by making them darker or brighter.

Due to the spatial separation of the light source or lighting device 7 from the display using scale segments 3 of display device 1000, it is possible to use straight-line lighting sources to produce a curved scale. Light guide device 33 between switch panels 29 and scale segments 3 also acts over a distance on the optical properties of the scale segments, so that the operator can clearly differentiate the actual value and setpoint of a display, thus greatly increasing operating reliability without requiring the use of expensive lighting sources for lighting device 7.

On the whole, it is apparent that the display device explained with reference to FIGS. 1 through 8 has a simple design and permits a differentiation between two related display parameters.

With the exemplary embodiment of display device 1 shown in FIGS. 1 and 2, the operator can recognize very easily, by comparing the two adjacent scales, implemented by adjacent scale segments 3 and 5, whether the set value corresponds to the desired setpoint. The two scales can be differentiated by a difference in brightness or color. In the exemplary embodiment of the concomitant scales according to FIGS. 1 and 2, two separate lighting devices 7 and 9 must be used, with the second lighting device 9 having individual lighting elements 15, each of which being assigned to one of scale segments 5.

The exemplary embodiment of display device 10 shown in FIGS. 3 and 4 is distinguished by the fact that there is only a single scale segment group which is implemented by scale segments 3. Within the scale segments of the scale, individual segments can be emphasized by having their color or brightness set off in comparison with the other segments. To do so, lighting device 9 is provided with individual lighting elements 15 which increase the brightness of individual scale segments or expose scale segments to an additional color, thus resulting in a mixed color which is formed by illuminating the two lighting devices 7 and 9.

Finally, it is clear that the exemplary embodiments of display devices 100 and 1000 explained with reference to FIGS. 5 through 8 have only a single lighting device. Accordingly, the scales of these display devices 100 and 100 have a single scale which is implemented by scale segments 3. Within the row of scale segments, individual segments can be emphasized by a deviation in brightness. The brightness differences are adjusted by switch panels 29, which are assigned to each individual scale segment 3. Switch panels 29 can be assigned directly to a scale segment 3, as shown on the basis of FIG. 5, or to a light guide device 33 which carries the light emitted by lighting device 7 to a scale segment 3, as illustrated on the basis of FIG. 7.

It is readily apparent from the preceding discussion that this display device can be used in general, i.e., it can also be used, for example, to display and visually differentiate the actual and set temperatures of a heating and air conditioning system or the like. In all cases, it is possible to use scale segments to display at least two related display parameters. The display device has a simple design and can thus be produced inexpensively while also being trouble-free. Furthermore, due to the different possible implementations, an optimum design may be selected: two separate scales, one scale for the actual value and a concomitant scale for the setpoint, can be used, or a single scale which is implemented by scale segments, some of which are set off by color, contrast and/or brightness to provide distinguishability of the display parameters.

It is also possible to implement more than two scales side by side and to make the display parameters shown on the scales distinguishable for an observer on the basis of color, contrast and/or brightness.

What is claimed is:

1. A display device of a vehicle for displaying at least two related display parameters, comprising:
    a first lightable scale segment arrangement; and
    a second lightable scale segment arrangement, the first lightable scale segment arrangement displaying at least one first display parameter of the at least two display parameters and the second lightable scale segment arrangement displaying at least one second display parameter of the at least two display parameters, the first lightable scale segment arrangement being a part of an analog display unit, at least one of a color, a contrast and a brightness of at least one of the first and second lightable scale segment arrangements being controlled to differentiate the at least one first display parameter from the at least one second display parameter;
    wherein the at least two display parameters correspond to actual values and setpoint values of a display scale.

2. The display device according to claim 1, further comprising:
    a first lighting device cooperating with scale elements of the first lightable scale segment arrangement; and
    a second lighting device cooperating with a single scale element of the second lightable scale segment arrangement including individual lighting elements.

3. The display device according to claim 2, wherein each of the first and second lighting devices is assigned to a respective one of the first and second lightable scale segment arrangements.

4. The display device according to claim 3, wherein the first lightable scale segment arrangement is arranged adjacent to the second lightable scale segment arrangement.

5. The display device according to claim 2, wherein the first and second lighting devices act only on one of the first and second lightable scale segment arrangements.

6. The display device according to claim 1, further comprising:
    a lighting device cooperating with scale elements of the first lightable scale segment arrangement; and
    a switching device cooperating with at least one of the scale elements of the first lightable scale segment arrangement to influence optical properties of the first lightable scale segment arrangement.

7. The display device according to claim 6, wherein the switching device cooperates with all of the scale elements of the first lightable scale segment arrangement.

8. The display device according to claim 6, wherein the switching device influences at least one of a brightness and a color of a respective one of the scale elements of the first lightable scale segment arrangement.

9. The display device according to claim 6, further comprising:
    a light guide device cooperating with at least one of the scale elements of the first lightable scale segment arrangement,
    wherein the switching device is arranged between the light guide device and the lighting device.

10. The display device according to claim 9, wherein the light guide device cooperates with all of the scale elements of the first lightable scale segment arrangement.

11. The display device according to claim 2, wherein the individual lighting elements influence at least one of a brightness and a color of a respective one of the scale elements of the first lightable scale segment arrangement.

12. The display device according to claim 1, wherein the display device is part of an automatic cruise control arrangement.

13. The display device according to claim 1, wherein the second lightable scale segment arrangement is part of another analog display unit.

14. The display device according to claim 1, wherein the first lightable scale segment arrangement and the second lightable scale segment arrangement are formed from perforations in a display area of the display device.

15. The display device according to claim 1, wherein the first display parameter is an actual speed and the second display parameter is a setpoint speed.

16. A display device of a vehicle for displaying at least two related display parameters, the display device being for use with an automatic cruise control arrangement, the display device comprising:

a lightable scale segment arrangement that is adapted to display the at least two related display parameters at the same time, wherein the lightable scale segment arrangement is part of an analog display unit, and at least one of a color, a contrast and a brightness of the lightable scale segment arrangement is controllable to differentiate the at least two related display parameters;

wherein the at least two display parameters correspond to actual values and setpoint values of a display scale, and a first display parameter correspond to an actual speed and a second display parameter corresponds to a setpoint speed.

17. The display device according to claim 16, further comprising a lighting device that provides illumination of a set of scale segments of the lightable scale segment arrangement, and an electro-optic layer that influences the illumination of at least one scale segment of the set of scale segments.

18. The display device according to claim 17, wherein the electro-optic layer is a liquid crystal layer.

19. The display device according to claim 17, wherein the lighting device is sealed off from a light box by a substantially light-proof partition.

20. The display device according to claim 19, wherein the set of scale segments is arranged as a curved scale segment arrangement.

21. The display device according to claim 20, wherein the lighting device is a straight-line lighting source.

* * * * *